United States Patent [19]

Mallick, Jr. et al.

[11] Patent Number: 4,704,569
[45] Date of Patent: Nov. 3, 1987

[54] DYNAMOELECTRIC MACHINE EXCITATION SYSTEM WITH IMPROVED GATE MODULE

[75] Inventors: George T. Mallick, Jr., Penn Hills; Carl J. Heyne, Allison Park, both of Pa.

[73] Assignee: Westinghouse Electric Corp., Pittsburgh, Pa.

[21] Appl. No.: 876,553

[22] Filed: Jun. 20, 1986

[51] Int. Cl.$^4$ .............................................. H02P 1/50
[52] U.S. Cl. ................................................... 318/718
[58] Field of Search ............................... 318/712–719; 361/88, 91, 56, 33

[56] References Cited

U.S. PATENT DOCUMENTS

| | | | |
|---|---|---|---|
| 3,350,613 | 10/1967 | Brockman et al. | 318/718 |
| 3,582,736 | 6/1971 | Geib. | |
| 3,748,555 | 7/1973 | Hoffman | 318/718 |
| 4,038,589 | 7/1977 | Heyne et al. | 318/718 |
| 4,594,632 | 6/1986 | Unnewehr | 361/91 |

OTHER PUBLICATIONS

Alberkrack et al., Linear/Switchmode Voltage Regulator Handbook, Motorola, Inc., 1982, pp. 121–134.

Primary Examiner—David Smith, Jr.
Attorney, Agent, or Firm—G. H. Telfer

[57] ABSTRACT

An electronic sensing and triggering circuit including an integrated overvoltage protection circuit is used in conjunction with an energy storage capacitor as well as output transistors for providing a vigorous voltage pulse supplied through a current pulse transformer to the gate of an SCR in a brushless excitation circuit discharge circuit branch.

2 Claims, 3 Drawing Figures

DYNAMOELECTRIC MACHINE EXCITATION SYSTEM WITH IMPROVED GATE MODULE

BACKGROUND AND SUMMARY OF THE INVENTION

This invention relates to dynamoelectric machine excitation systems such as brushless exciters for synchronous motors.

FIG. 1 shows a synchronizing circuit for a synchronous AC motor for supplying DC excitation from a full wave bridge rotating rectifier 10 to the rotor field winding 12 of the motor. A pulse or synchronizing module B is configured for the control of SCR2.

The present invention has particularly to do with improvements in the gate module A for the control of the turning on of SCR1.

During the synchronizing process of an AC synchronous motor, the rotor sees a very large flux wave produced by stator winding 14. Since the effective area of the rotor is large, the number of turns of the stator winding is large, and the permeability of the rotor is high, this field is capable of inducing several tens of thousands of volts in the winding 12 of the rotor. Such a voltage would be capable of destroying the rotor insulation if steps were not taken to avoid it.

In practice, a resistive load, such as resistor R of FIG. 1, is placed across the rotor winding 12 to reduce this large voltage by allowing current to flow. Resistor R cannot be left in the circuit following synchronization, however, since it would dissipate considerable power and not endure for a long life.

In order effectively to remove the resistor R from the circuit following synchronization, it is connected to the rotor winding by means of a diode D and a thyristor type device SCR1 connected in inverse parallel relationship. The diode D allows current to flow easily in one direction while blocking positive voltages which will normally be in the range of 30 to 150 volts DC while the motor is running in synchronism. SCR1 is intended to be triggered to conduct when the positive voltage is greater than approximately 200 volts. This voltage is greater than the maximum DC supply voltage available but it is also less by a considerable margin than the smallest voltage likely to cause damage to any of the insulation of winding 12.

The above-mentioned voltages are by way of example. More generally, the present invention has as an objective to provide an improved gate module for an excitation system in which the controlled voltage across the SCR is at least about 100 volts.

The gate module A is a device or circuit which senses the voltage on the anode of SCR1 (at circuit point TP) and delivers a gate pulse to gate electrode G to start conduction upon that voltage reaching a predetermined trigger level. Previous gate modules have been very simple circuits such as that illustrated in block A of FIG. 2. It utilizes a Zener diode Z to provide the voltage sensing function and, after breakdown of the Zener diode, to supply current to the gate electrode G of SCR1 to trigger the SCR. A resistor RG is connected between the gate electrode G and the cathode electrode C. The Zener diode Z produces very poor gate drive since the voltage used for triggering collapses as soon as the SCR starts to conduct. Also, this type of gate module cannot be expected to deliver the steep rising pulse necessary to cause the SCR to quickly go into conduction over its entire junction area. Soft triggering of an SCR is known to be likely to produce premature failure of the device. Therefore, what is needed is an improved gate module that provides a vigorous gate pulse capable of causing SCR1 to go quickly into conduction over its entire area and to do so with a circuit that is capable of the dense packaging required for use in brushless excitation systems with a high degree of economy and reliability.

Reference is made to *Linear/Switchmode Voltage Regulator Handbook*, a 1982 publication of Motorola, Inc., by J. Alberkrack et al., pages 121 through 134, for description of SCR crowbar overvoltage protection circuits and particularly the use of modern electronic integrated circuits such as that designated type MC3423 in such circuits.

The present invention utilizes an integrated overvoltage protection circuit for precise sensing of anode voltage of SCR1 and to provide a vigorous gate pulse when provided with energy storage in a capacitor to prevent the sudden collapse of the voltage available for triggering the SCR, resulting in more uniform triggering pulses. In contrast to prior known applications of such integrated circuits, the present invention is adapted to the particular requirements of synchronous motor excitation systems in which the controlled voltage is at least about 100 volts and typically approximately 200 volts, in a gate module that provides the compact packaging, high economy and reliability required of brushless motor excitation systems.

PREFERRED EMBODIMENT

Figure 3:
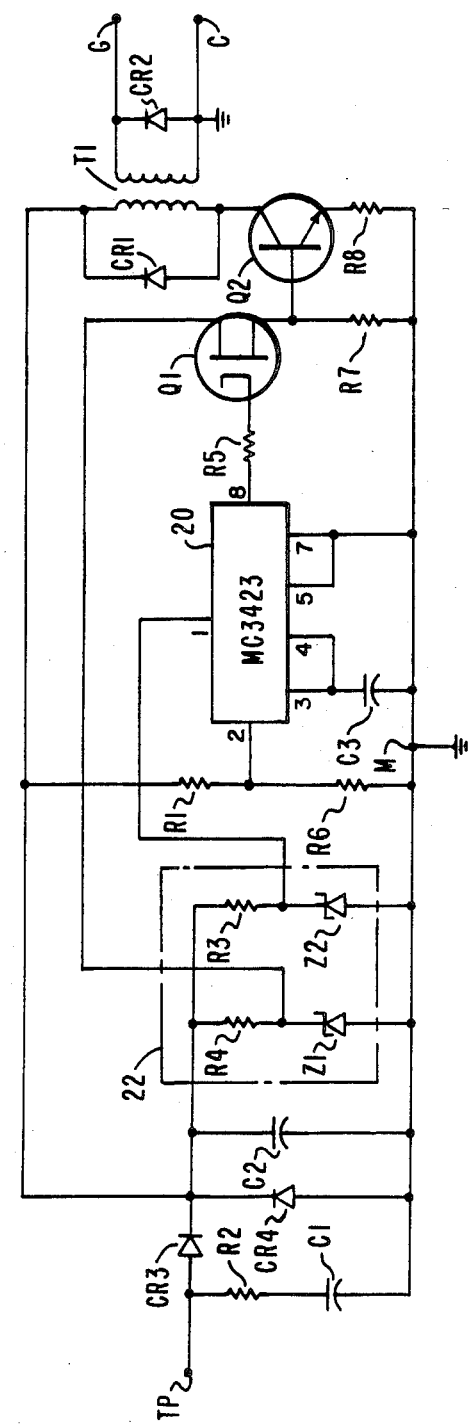
FIG. 3 is a circuit schematic of an improved gate module in accordance with an embodiment of the present invention.

Referring now to FIG. 3, a new gate module for a brushless exciter is illustrated.

The circuit improves upon previous gate module circuits in that it provides more reliable triggering than was previously available. The new circuit utilizes an integrated circuit or IC 20 that is commercially available and has been designed to detect overvoltage conditions and provide triggering for an SCR crowbar circuit. In the present gate module, that integrated circuit, such as type MC3423, is used in a different way than it is known to have been used before. Further information regarding the nature of the integrated circuit and operation may be found by reference to the above-mentioned Motorola handbook.

Figure 1:
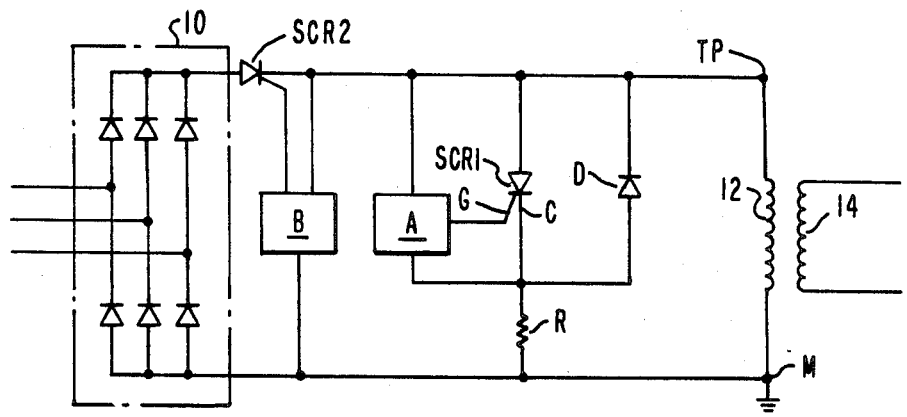
FIGS. 1 and 2 are circuit schematics discussed in the above discussion of the background of the invention.
Figure 2:
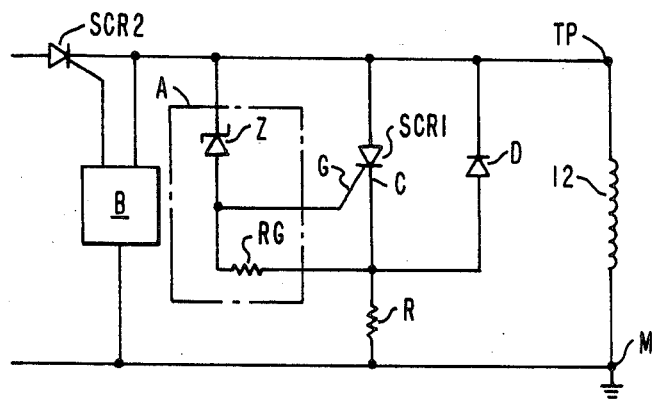

Terminal points TP, G, and C are indentified on the circuit of FIG. 3 so that it can be readily seen how the circuit is utilized in the larger circuit of FIG. 1.

The triggering or tripping point of the circuit is determined by a voltage divider network consisting of resistors R1 and R6 that is connected to input terminal 2 of the integrated circuit. The terminals of the integrated circuit are identified in accordance with the manufacturer's identification which is on a type MC3423 device. For the present purposes of a gate module in an excitation circuit, the triggering or trip point is set to 210 volts, for example.

A capacitor C3 is connected as shown to terminals 3 and 4 of the integrated circuit for establishing a slight delay, three microseconds in this example, for tripping in order to obtain some noise immunity.

When the IC 20 senses a voltage greater than the reference level across SCR1, the IC fires producing a positive voltage of approximately 9 volts at its output terminal 8 supplied to the gate of field effect transistor Q1. Since the IC 20 is capable of acting as a current source of approximately 300 milliamperes, the gate to source capacitance of the field effect transistor Q1 is quickly charged and a fast rising pulse results. Q1 is quickly charged and a fast rising pulse results. Q1 is thus turned on, its source voltage rising to approximately 8 volts. This is sufficient to turn on bipolar transistor Q2, which conducts current in sufficient quantity to cause its emitter to rise to approximately 7 volts. This current value is approximately 250 ma.

This current is supplied from TP continuously until SCR1 conduction drops the voltage sufficiently to reverse bias gate module input diode CR3. After CR3 is reverse biased, current is supplied for a short time by capacitor C2, which has been fully charged.

As long as the current is being supplied, it goes through pulse transformer T1, which has a primary winding connected with the bipolar transistor Q2 as shown and which has a secondary winding connected across the gate G and cathode C of the SCR. Thus a current pulse of approximately 250 milliamperes is delivered to the gate G of SCR1.

The current pulse will persist until capacitor C2, which is an energy storage capacitor for providing a vigorous gate pulse, is discharged sufficiently to turn off the comparator circuitry contained within the IC 20. That is, the discharge of capacitor C2 means that the IC is returned below its trip level. In actual operation, gate pulses lasting for 75 microseconds have been observed which is a duration quite satisfactory for fully turning on the SCR.

In essence, the circuitry of the invention provides for charging the capacitor C2 until the triggering level of the IC 20 is reached at which time the capacitor is discharged through the gate-cathode junction of the SCR. In circuits made and tested very satisfactory results have been obtained.

Resistors R2 and capacitor C1 form a snubber network which limits the rate of rise of voltage across SCR1.

Diodes CR3 and CR4 are for the purpose of assuring against the wrong polarity voltage reaching the IC20.

Power supply circuit portion 22 includes resistors R3 and R4 and Zener diodes Z1 and Z2 connected so as to establish a 10 volt power supply for the integrated circuit 10 at its terminal 1 and also for establishing a 40 volt supply for field effect transistor Q1.

The following table presents, by way of further example, specifically identified components for the circuit of FIG. 3 which have been used and produced the pulse firing as described in the above description.

| Integrated circuit 20 | MC3423 |
| --- | --- |
| Resistor R1 | 475K.-ohms, 1% |
| Resistor R2 | 47 ohms |
| Resistor R3 | 10K.-ohms |
| Resistor R4 | 20K.-ohms |

| Integrated circuit 20 | MC3423 |
| --- | --- |
| Resistor R5 | 1K.-ohms |
| Resistor R6 | 5620 ohms, 1% |
| Resistor R7 | 470 ohms |
| Resistor R8 | 30 ohms |
| Capacitors C1 and C2 | 0.1 microf. |
| Capacitor C3 | 300 pf. |
| Diodes CR1, CR2, CR3, CR4 | IN814 |
| Field effect transistor Q1 | MPF 910 |
| Bipolar Transistor Q2 | MJE 340 |
| Transformer T1 | BN 505-3702 |

It is therefore seen that the present invention applies a recently developed electronic integrated circuit to a problem removed from its normally intended applications. Such integrated circuits have been designed for use in low voltage power supply crowbar circuits yet it is here applied to facilitate the proper operation of a large motor in its brushless excitation system. The application of the circuit to provide a controlled amplitude current pulse through a pulse transformer, mediated by transistors Q1 and Q2, is considered a significant advance. In such combination, the integrated circuit is now used to gate a thyristor or SCR device at voltages high above ground potential and considerably higher than the ±15 volt level which is normally contemplated with such devices.

While the present invention has been shown and described in a few forms only, it will be apparent that various modifications can be made consistent with established electronic circuitry technology and excitation system technology.

We claim:

1. A gate module, for controlling the turn-on of an SCR in a discharge current path paralleling a DC field winding of a dynamoelectric machine, comprising:
    an integrated circuit containing an overvoltage protection circuit;
    means for establishing a reference voltage level for said integrated circuit to be tripped;
    means for delaying the trip of said integrated circuit a predetermined time after said reference voltage level has been reached; and,
    means for producing a current pulse at the gate electrode of the SCR, sufficient to turn on the SCR, after said integrated circuit is tripped;
    said integrated circuit being preceded at its input by a snubber network that limits the rate of rise of voltage across the SCR and by energy storage means that charges up as voltage across the SCR increases, and
    said means for producing a current pulse at the gate electoded of the SCR including a field effect transistor that is turned on by an output from said integrated circuit after a trip, a bipolar transistor that is turned on by said field effect transistor, a pulse transformer with a primary winding in direct connection with said bipolar transistor and a secondary winding in direct connection with the gate of the SCR.

2. A gate module in accordance with claim 1 wherein:
    said means for establishing a reference voltage level comprises a voltage divider network having respective resistors connected to an input terminal of said integrated circuit, said reference voltage level being at least about 100 v.

* * * * *